April 28, 1970  C. S. CUSICK  3,508,902

WETBACK HEATING APPARATUS

Original Filed June 17, 1966

INVENTOR

CHARLES S. CUSICK

BY Chisholm and Spencer

ATTORNEYS

United States Patent Office 3,508,902
Patented Apr. 28, 1970

3,508,902
WETBACK HEATING APPARATUS
Charles S. Cusick, Pittsburgh, Pa., assignor to PPG Industries, Inc., Pittsburgh, Pa., a corporation of Pennsylvania
Continuation of application Ser. No. 558,441, June 17, 1966. This application Dec. 11, 1968, Ser. No. 782,957
Int. Cl. C03b 18/00
U.S. Cl. 65—182                                             3 Claims

ABSTRACT OF THE DISCLOSURE

In the float glass process, apparatus consisting of a heating means mounted below the lip tile but above the wetback to apply heat uniformly and transversely of the molten metal bath and across the entire extent of the wetback at a location rearwardly of the forward flow of the glass from the wetback.

CROSS REFERENCE TO RELATED APPLICATION

This application is a continuation of my copending application, Ser. No. 558,441, filed June 17, 1966, now abandoned, entitled "Manufacture of Glass."

This invention relates to the manufacture of flat glass wherein a mass of molten glass is supported on a bath of molten metal. The process is commonly known as the "float glass process" and the flat glass produced thereby is known as "float glass."

In the float glass process, a mass of molten glass is deposited onto a bath of molten metal, usually tin, and, when permitted to spread freely laterally and moved such that the same quantity of glass passes any transverse line across the float bath per unit time, the glass will achieve a certain thickness, known as equilibrium thickness. When soda-lime-silica glass of the general composition of plate or sheet glass is used, the equilibrium thickness is 0.0270 inch. The surface finish and uniformity of thickness depends upon residence time on the bath, i.e., the glass should have sufficient time to level out.

In the commercial embodiment of the float glass process, the molten glass is delivered over a lip and into a pile onto the molten metal. The pile of glass is known as a heel, onion or wetback and is the source of glass which spreads to form the ribbon, its thickness exceeding the thickness of the ultimate ribbon.

Glass generally flows from the wetback back toward the melting tank and then outwardly therefrom, much like a fan, to form the ribbon. When conditions are such that the glass in the wetback stagnates, the glass flow from the wetback changes and the ribbon formed has bubbles and/or lines and/or distortion and/or thickness variations therein, which affect the optical quality of the glass. The actual source of these defects is unknown. Stagnation of the glass in the wetback area indicates that the glass is too viscous; it is too cold, or, stated differently, the glass has lost too much heat. Devitrification of the glass can also occur, which condition affects the flow of glass from the heel.

The defects and conditions enumerated above are especially present when making glass of a thickness greater than equilibrium, as for example when glass flow, both laterally and along the bath, is restricted and the glass is not permitted to achieve equilibrium thickness, but is chilled to a greater thickness. However, the invention is applicable to the process of making float glass regardless of its thickness; its use depends upon the actual conditions encountered.

To eliminate the difficulties of the wetback area, above enumerated, it is proposed, according to this invention, to provide means to supply additional heat to or reduce the loss of heat from the wetback in order to improve the flow of glass therefrom and to prevent stagnation and/or devitrification of the glass therein. This is accomplished by incorporating a heating element, into the wetback area, i.e., located above the glass below the feeding lip and adjacent the wetback tile. The heating element is in addition to the heaters in the headspace above the bath.

To more fully understand this invention, attention is now directed to the accompanying drawings, in which.

Figure 1:
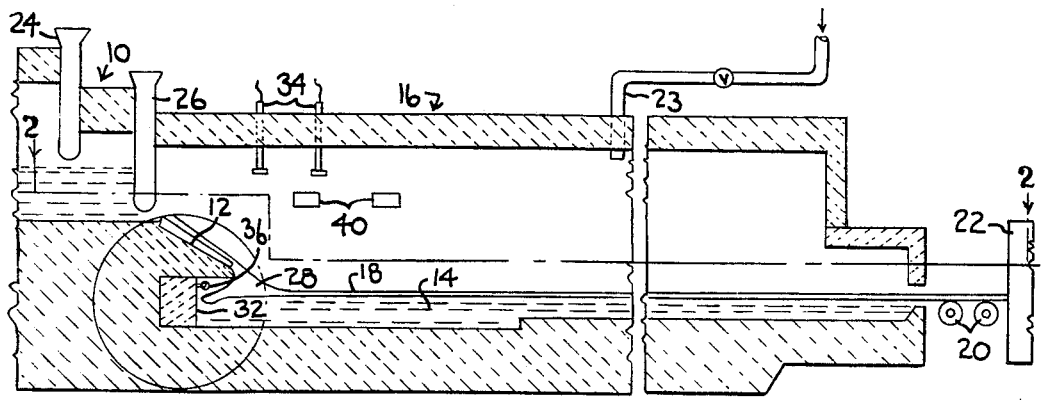
FIG. 1 is a longitudinal section through a typical float glass-producing apparatus which incorporates means, according to this invention, to eliminate stagnation of glass in the wetback area.
Figure 2:
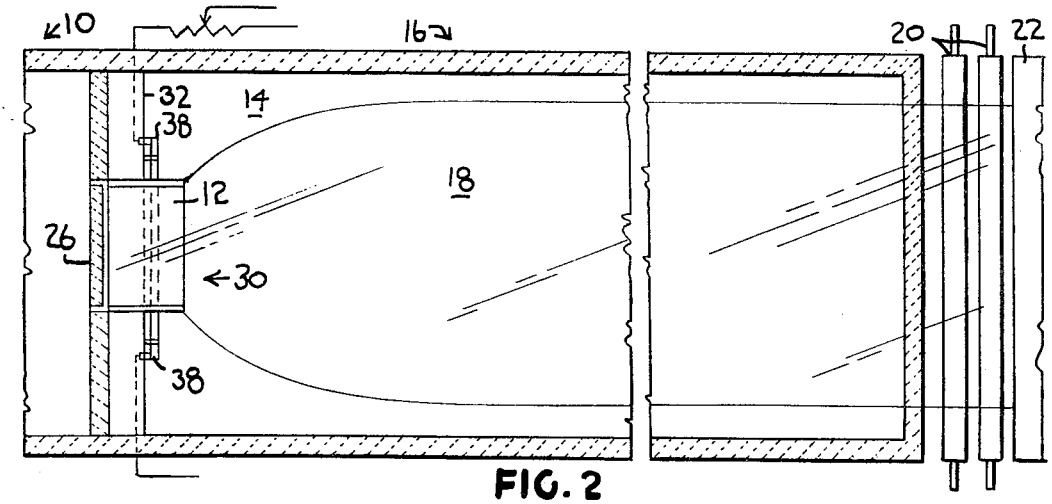
FIG. 2 is a view taken along line 2—2 of FIG. 1.

Turning now to the drawings, there is shown a float glass-producing apparatus which includes a glass-melting tank 10 (only a portion of which is shown, but which is conventional in construction) from which molten glass is discharged over a lip 12 onto a bath of molten tin 14 in a float tank 16 to form a ribbon of glass 18. The ribbon of glass is conveyed by take-out rolls 20 at the exit end of the tank 16 from the bath 14 into an annealing lehr 22 of conventional construction. A protective atmosphere, such as nitrogen alone or with a small percentage of hydrogen, is supplied in the headspace above the bath 14 through a pipe 23 connected through a regulator valve to a suitable source of the atmosphere. The atmosphere substantially reduces oxidation of the tin bath.

The flow of molten glass from the melting tank 10 is controlled by vertically movable tweels 24 and 26 and collects as a heel or onion 28 in what is known as the wetback area, generally identified by the reference number 30. The heel or onion supplies the glass to form the ribbon 18 and, in addition to the surface flow of glass in a forward direction, i.e., toward the exit end of the tank 16, there is a reverse flow toward a wetback tile 32 which supports the lip 12 and thereafter a diverging spiraling flow as indicated by the arrows in FIG. 3. In some installations, heater elements 34 are provided in the roof of the float tank 16; these are energized and supply heat when necessary to the upper surface of the glass flowing over the lip and into the ribbon.

In order to avoid stagnation and/or devitrification of the glass in the wetback area, manifested by buildup of glass in the heel or onion 28 and glass buildup on the refractory wetback tile 32, there is according to this invention, a resistance heater element 36 located adjacent the wetback tile 32, below the lip 12 and above the glass in the portion of the heel or onion below the lip 12.

The heater element 36 is supported, as by brackets, and is electrically energized and is preferably constructed of a silicon carbide member known as a Glo-Bar or Hot-Rod, depending upon its manufacturer. In any event, the member is an electrical resistance and becomes heated when energized and reduces the loss of heat from the glass. Silicon carbide is stable at the operating temperatures and conditions and has a relatively fixed resistance regardless of the temperature encountered in use. Suitable conductors or bus bars 38 are provided to connect the rod to supply energy thereto and are connected to the ends thereof in the conventional manner. The actual surface temperature is controlled by an AC potentiometer 39 in the circuit. The silicon carbide resistance element is energized by a low voltage, generally about 50 volts and less than 110 volts and a high current which in many cases may exceed 125 amperes.

Figure 3:
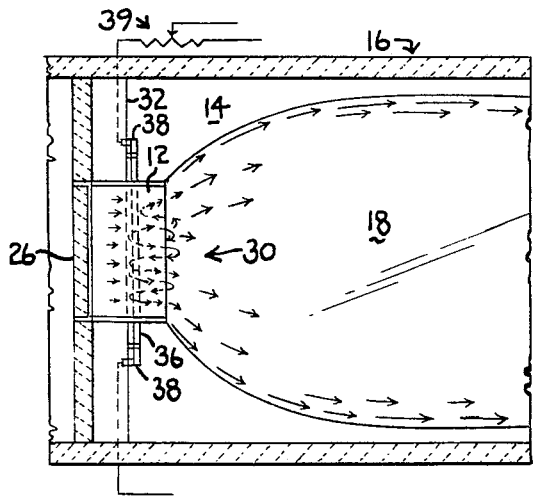
FIG. 3 is an illustration of proper glass flow in the wetback area of a float tank.
Figure 4:
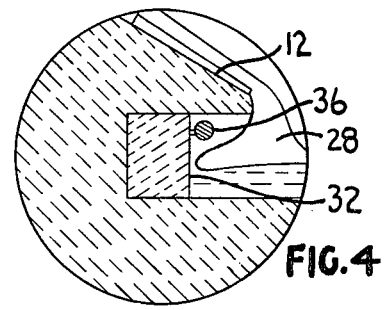
FIG. 4 is an enlarged view of the circled portion of FIG. 1.

In order to utilize the heating element 34 the glass being produced must be inspected for lines and bubbles and the flow of glass at the wetback area must be observed. For this purpose, there are inspection windows 40 in the side walls of the tank 16. The operator must then adjust the power input until the flow of glass from the wetback area appears as depicted in FIG. 3 in order to achieve a quality product. Experience dictates the electrical input to the heater element 36.

The total input of power rarely exceeds 10 kw. for the entire length of the element; it is generally 4 to 5 kw. for its entire length, although the power input can be, with the life of the element considered, on the order of 50 watts per square inch of surface, while the surface temperature of the element may be as high as 2600° F. to 3000° F.

In a production tank, approximately 150 feet in length and 230 inches in width, so as to produce a ribbon, with controlled flow of glass, of 130 inches in width, the lip is approximately 40 inches wide. The lip in such a tank extends over the tin bath 5½ to 6 inches and approximately 3 inches above the bath. Glass in the wetback area, i.e., the heel or onion, rarely should exceed 2 inches in depth and is discharged onto the bath at a temperature of approximately 2000° F. A heater element 34 having an effective length of 60 inches and a diameter of 1 inch is centrally placed at the junction of the lip 12 and the wetback tile. This element extends a distance greater than 60 inches because of end extensions to which the electrical conductors are connected.

Because of space limitations in the tank described heater elements much exceeding 1½ inches in diameter cannot be used. Smaller diameter elements, as for example ¾ inch, can be used. The element can extend across the entire width of the bath, if desired; however, generally this is not necessary.

I claim:
1. In apparatus for producing flat glass which includes a bath of molten tin for supporting a wetback mass of molten glass and the ribbon of flat glass generated therefrom, a tank containing said bath, a refractory lip-member having a portion overhanging said bath over which molten glass is delivered onto said bath into said mass of molten glass, the improvement which comprises, heating means positioned below said lip-member at a location above said wetback and extending transversely across the entire extent of said wetback for supplying heat to said wetback, and means to energize and control said heating means.

2. Apparatus as recited in claim 1 wherein said heating means includes an electrical resistance element.

3. Apparatus as recited in claim 2, wherein said resistance element is constructed of silicon carbide.

References Cited
UNITED STATES PATENTS

| | | | |
|---|---|---|---|
| 2,911,759 | 11/1959 | Pilkington et al. | 65—182 XR |
| 3,301,651 | 1/1967 | Long | 65—182 |
| 3,351,452 | 11/1967 | Robinson | 65—182 |
| 3,445,214 | 5/1969 | Ormesher | 65—99 |

S. LEON BASHORE, Primary Examiner

J. H. HARMAN, Assistant Examiner

U.S. Cl. X.R.

65—99, 65